United States Patent [19]

Robinson

[11] 4,345,945

[45] Aug. 24, 1982

[54] METHOD FOR DISPERSING COMMINUTED SOLIDS

[75] Inventor: Glenn N. Robinson, Terre Haute, Ind.

[73] Assignee: International Minerals & Chemical Corp., Terre Haute, Ind.

[21] Appl. No.: 214,606

[22] Filed: Dec. 9, 1980

[51] Int. Cl.$^3$ .......................... C09C 1/36; C09C 1/02
[52] U.S. Cl. ................. 106/300; 106/288 B; 106/306; 106/308 B
[58] Field of Search .................... 106/288 B, 300, 306, 106/308 B

[56] References Cited

U.S. PATENT DOCUMENTS

| | | | |
|---|---|---|---|
| 3,345,187 | 10/1967 | Binnis | 106/300 X |
| 3,567,479 | 3/1971 | Portes et al. | 106/300 |
| 3,702,773 | 7/1972 | Hall et al. | 106/300 |
| 3,772,046 | 11/1973 | Knapp et al. | 106/300 |
| 3,847,640 | 11/1974 | Daubenspeck et al. | 106/300 |
| 4,052,223 | 10/1977 | Howard | 106/300 |
| 4,118,247 | 10/1978 | Marchetti et al. | 106/288 B |
| 4,186,028 | 1/1980 | Woditsch et al. | 106/300 |
| 4,244,933 | 1/1981 | Shibazaki et al. | 106/306 X |

FOREIGN PATENT DOCUMENTS 776183  9/1968  Canada .................. 400/45

*Primary Examiner*—Carl F. Dees
*Attorney, Agent, or Firm*—Robert H. Dewey

[57] ABSTRACT

A method for dispersing a comminuted solid in an aqueous medium using a mono-, di- or tri- salt of an alkanolamine and an acid of phosphorous, or a mixture thereof, as the dispersing agent.

16 Claims, No Drawings

METHOD FOR DISPERSING COMMINUTED SOLIDS

BACKGROUND OF THE INVENTION

This invention relates to a method for dispersing comminuted solids. In a particular aspect, this invention relates to dispersing solids in an aqueous medium.

Slurries and suspensions of comminuted solids in an aqueous medium are customarily formed using a dispersing agent. Such an agent can be inorganic, such as alkali phosphates, or more often an organic surfactant is used. Such surfactants include fatty acid soaps of an alkali metal or an alkanolamine, a long chain quaternary ammonium halide, or a non-ionic, such as a polyoxyethylene ether or ester. Also, alkanolamines per se have been used to disperse powdered titanium dioxide to produce slurries which are used in a variety of ways, such as to provide a convenient form for shipping the pigments, or for the preparation of water-based coating materials. As another example, it is known from U.S. Pat. Nos. 3,702,773 and 3,772,046 and Canadian Patent 776,183 to prepare aqueous slurries of titanium dioxide using an alkanolamine, such as 2-amino-2-methyl-1-propanol (hereinafter designated AMP).

SUMMARY OF THE INVENTION

It is an object of this invention to provide a method for dispersing comminuted solids.

It is another object of this invention to provide a method for dispersing solids in an aqueous medium.

It is yet another object of this invention to provide a method for dispersing calcium carbonate solids which develop in aqueous hard water systems.

It is still yet another object of this invention to provide a method for preparing slurries of pigments in water.

Other objects will be apparent to those skilled in the art from the disclosure herein.

It is the discovery of this invention to provide a method for dispersing a comminuted solid in an aqueous medium using a salt of an alkanolamine and an acid of phosphorous or a mixture thereof as the dispersing agent.

DETAILED DISCUSSION

The alkanolamines useful in the practice of this invention can be primary, secondary or tertiary. They include but are not limited to 2-amino-2-methyl-1-propanol (AMP); 1-amino-1-butanol; 2-amino-2-methyl-1,3-propanediol; 2-amino-2-ethyl-1,3-propanediol; 2-amino-2-hydroxymethyl-1,3-propanediol and N-methyl and N,N-dimethyl derivatives thereof. Also included are the ethanolamines and propanolamines and N-substituted alkyl (e.g. methyl)derivatives thereof. AMP is the preferred alkanolamine for the practice of this invention.

The term "acid of phosphorous" is intended to include the following acids: orthophosphoric ($H_3PO_4$), metaphosphoric ($HPO_3$), pyrophosphoric ($H_4P_2O_7$), hypophosphoric ($H_4P_2O_6$) and hypophosphorous ($H_3PO_2$). These acids may be either wholly or partially neutralized with the alkanolamine. Orthophosphoric is the preferred acid.

The preferred salt for the practice of this invention is the monohydrogen (i.e. the di-AMP) salt of 2-amino-2-methyl-1-propanol (AMP) with phosphoric acid. The mono-AMP (AMP.$H_3PO_4$) and tri-AMP [(AMP)$_3$.$H_3PO_4$] salts are also useful, although generally not as efficient as the di-AMP. Accordingly, it is contemplated that mixtures of salts are the practical equivalent of the di-AMP salt. The di-AMP salt will hereinafter be designated (AMP)$_2$.$H_3PO_4$ for convenience.

The preferred salt of this invention is useful for dispersing a wide variety of comminuted solids including but not limited to calcium carbonate such as occurs in aqueous systems employing hard water (e.g. cooling tower waters and boiler waters), inorganic pigments such as iron oxides, talc (magnesium silicate), silica, mica, bentonite, carbon black, chrome pigments, and organic pigments. The invention is especially useful for preparing typical water-based coating materials.

The amount of AMP phosphate salt, or mixture thereof, to be used varies somewhat with regard to the comminuted solid to be dispersed and the degree of stability desired. Generally from 0.001% to about 10% based on the weight of the comminuted solid is sufficient. More often the amount will be from 0.01–5% and a commonly used amount is from 0.1–1.0%. The optimum amount required for any particular use can be readily determined by one of ordinary skill.

The invention will be better understood with reference to the following examples. It is understood, however, that these examples are intended only to illustrate the invention and it is not intended that the invention be limited thereby.

EXAMPLE 1

AMP dihydrogen phosphate, (AMP).$H_3PO_4$, was prepared by mixing AMP with 86% phosphoric acid in a 1:1 mole ratio in the presence of sufficient water to form a 25% solution. Of this solution, 0.025 g was diluted with 1000 g of water to form a solution of 6.2 ppm of dispersant.

A saturated aqueous solution of sodium bicarbonate at room temperature was prepared, as was a saturated aqueous calcium hydroxide solution. Into a 10 ml graduated cylinder there was added 3.3 ml of the calcium hydroxide solution and 1 ml of the dilute AMP phosphate solution. Sodium bicarbonate solution was then added in an amount sufficient to make 10 ml, thus providing a concentration of 0.625 ppm of the dispersant. A similar test was run as a control except that no dispersant was added. The turbidity of the cylinders was measured every 30 minutes in a turbidimeter. The longer the dispersions remained turbid, the more satisfactory the dispersing agent. The results are given in the table. It was concluded that AMP dihydrogen phosphate was a dispersant for calcium carbonate and was suitable for use in cooling tower waters.

TABLE

| Time, Hours | Degree of Settling | | |
|---|---|---|---|
| | Control | (AMP)$_2$.$H_3PO_4$ | AMP.$H_3PO_4$ |
| 0.5 | 1.2% | 0% | 0% |
| 1.0 | 4.0% | 4.0% | 4.0% |
| 1.5 | 10.0% | 4.0% | 8.5% |
| 2.0 | 14.0% | 10.0% | 13.0% |
| 2.5 | 20.0% | 14.0% | 17.5% |
| 3.0 | 24.0% | 18.0% | 22.0% |
| 3.5 | 29.0% | 22.0% | 27.0% |
| 4.0 | 40.0% | 26.0% | 36.0% |

EXAMPLE 2

The experiment of Example 1 was repeated in all essential details except that AMP monohydrogen phosphate, $(AMP)_2.H_3PO_4$, was substituted for AMP dihydrogen phosphate. It was prepared by reacting AMP and 86% phosphoric acid in a 2:1 mole ratio in sufficient water to make a 25% solution and then diluted as before. The results are given in the table at the end of Example 1. The AMP monohydrogen phosphate is superior to the dihydrogen phosphate as a lime dispersant.

EXAMPLE 3

A slurry of titanium dioxide in water was prepared according to the following formula. A similar preparation using a commonly used commercial dispersant was used as a control:

|  | Test | Control |
|---|---|---|
| Deionized Water | 116.2 g | 116.2 g |
| $(AMP)_2.H_3PO_4$** | 0.95 g | — |
| Tamol* 731** | — | 0.95 g |
| $TiO_2$ | 380 | 380 |
| Pigment, % | 76 | 76 |
| pH | 8.5 | 7.6 |

*Trademark of Rohm and Haas Company.
**Used as a 25% aqueous solution.

| Brookfield Viscosity | | |
|---|---|---|
| 20 rpm | 225 cp | 1425 |
| 50 rpm | 150 cp | 820 |
| 100 rpm | 135 cp | 560 |

It is apparent that $(AMP)_2.H_3PO_4$ is very effective as a dispersing agent for titanium dioxide.

EXAMPLE 4

The experiment of Example 3 was repeated in all essential details except that aluminum silicate pigment was substituted for titanium dioxide. The aluminum silicate used was ASP-100 clay, which is a water-washed clay marketed by Englehard Minerals and Chemical Corporation.

| Composition and Viscosity | | |
|---|---|---|
|  | Test | Control |
| Deionized Water | 149.8 g | 149.8 g |
| $(AMP)_2.H_3PO_4$* | 10.2 | — |
| Tamol 731* | — | 10.2 |
| Pigment | 340 | 340 |
| Pigment, % | 68 | 68 |
| pH | 6.1 | 5.0 |
| Viscosity at | | |
| 20 rpm | 4050 cp | 2870 cp |
| 50 rpm | 1760 cp | 1760 cp |
| 100 rpm | 866 cp | 1228 cp |

*Used as a 25% aqueous solution.

It is apparent that $(AMP)_2.H_3PO_4$ is very effective as a dispersing agent for aluminum silicate pigment.

EXAMPLE 5

A water-based, flat wall paint of the interior type was prepared according to the following formula.

| Premix | |
|---|---|

| -continued | |
|---|---|
| Deionized Water | 193.5 lb |
| $(AMP)_2.H_3PO_4$ | 10.5 lb |
| Disperse Pigments | |
| Rutile | 150.0 |
| Calcium Carbonate | 200.0 |
| Aluminum Silicate | 125.0 |
| Grind, then add | |
| Ethylene Glycol | 30.0 |
| Hydroxyethyl Cellulose* | 235.8 |
| Tributyl Phosphate | 15.0 |
| Vinyl Acetate Copolymer Emulsion | 200.0 |
| Defoamer | 2.0 |
| AMP-95 | 2.0 |
|  | 1163.8 |

AMP-95 is an aqueous solution containing 95% 2-amino-2-methyl-1-propanol.

This formulation had a stable viscosity and pH. It gave a very white and opaque film.

I claim:

1. A method for dispersing a comminuted solid in an aqueous medium comprising the step of using as a dispersant a neutral or an acid salt of a primary, secondary or tertiary amino alkanolamine with an acid of phosphorus.

2. The method of claim 1 wherein the alkanolamine is 2-amino-2-methyl-1-propanol (AMP); 2-amino-1-butanol; 1,3-propanediol; 2-amino-2-hydroxymethyl-1,3-propanediol; 2-amino-2-hydroxymethyl-1,3-propanediol and N-methyl and N,N-dimethyl derivatives thereof, the mono-, di-, and tri-ethanolamines and propanolamines and N-substituted alkyl derivatives thereof, or mixtures thereof.

3. The method of claim 1 wherein the acid of phosphorous is orthophosphoric, metaphosphoric, pyrophosphoric, hypophosphoric or hypophosphorous, or mixtures thereof.

4. A method of dispersing a comminuted solid in an aqueous medium comprising the step of using as a dispersant a mono-, di-, or tri-salt of 2-amino-2-methyl-1-propanol and phosphoric acid or a mixture thereof as the dispersing agent.

5. The method of claim 4 wherein the mono-AMP acid phosphate is used.

6. The method of claim 4 wherein the di-AMP phosphate is used.

7. The method of claim 1 wherein the dispersant is used in an amount of 0.001% to 10.0% based on the weight of the comminuted solid.

8. The method of claim 7 wherein the amount of dispersant is from 0.01 to 5%.

9. The method of claim 7 wherein the amount of dispersant is from 0.1 to 1.0%.

10. The method of claim 1 wherein the comminuted solid is calcium carbonate formed in situ.

11. The method of claim 1 wherein the comminuted solid is a pigment and the aqueous medium is a water-based coating material.

12. An aqueous slurry of a comminuted pigment consisting essentially of a pigment, water and a salt of claim 1.

13. An aqueous slurry of a comminuted pigment consisting essentially of a pigment, water and the salt of 2-amino-2-methyl-1-propanol reacted with phosphoric acid in a 1–3:1, respectively, mole ratio.

14. The slurry of claim 12 wherein the ratio is 2:1.

15. The slurry of claim 12 wherein the pigment is titanium dioxide.

16. The slurry of claim 12 wherein the pigment is aluminum silicate.

* * * * *